(12) United States Patent
Priddy

(10) Patent No.: US 7,251,363 B2
(45) Date of Patent: Jul. 31, 2007

(54) METHOD AND SYSTEM FOR CREATING AN IMAGE MASK

(75) Inventor: Carl A. Priddy, Oro Valley, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 729 days.

(21) Appl. No.: 10/630,508

(22) Filed: Jul. 29, 2003

(65) Prior Publication Data
US 2005/0025359 A1 Feb. 3, 2005

(51) Int. Cl.
*G06K 9/34* (2006.01)
*G06K 9/00* (2006.01)
(52) U.S. Cl. ...................... 382/173; 382/128
(58) Field of Classification Search ............... 382/128, 382/173, 199; 345/627
See application file for complete search history.

(56) References Cited

U.S. PATENT DOCUMENTS

| 5,479,591 A | 12/1995 | Goto ........................ 345/627 |
| 5,659,490 A | 8/1997 | Imamura .................... 358/500 |
| RE35,657 E | 11/1997 | Buckley et al. ............ 358/296 |
| 5,790,690 A * | 8/1998 | Doi et al. .................... 382/128 |
| 6,169,816 B1 | 1/2001 | Ravkin ....................... 382/128 |
| 6,571,000 B1 | 5/2003 | Rasmussen et al. ........ 382/112 |

FOREIGN PATENT DOCUMENTS

| EP | 0693738 A2 | 1/1996 |
| EP | 0693738 A3 | 1/1996 |
| EP | 01139284 A2 | 10/2001 |
| EP | 01223550 A2 | 7/2002 |
| JP | 09181924 | 7/1997 |
| JP | 01313844 | 11/2001 |
| JP | 02197457 | 7/2002 |

OTHER PUBLICATIONS

Published International Search Report and Written Opinion, PCT/US2004/019514, dated Nov. 11, 2004.
The MathWorks, Inc., *Image Processing Toolbox for use with MATLAB*, User's Guide, Ver. 3, Apr. 2001, pp. 3-26, 3-27, 11-1 to 11-9, and 14-344 to 14-349.

(Continued)

*Primary Examiner*—Duy M. Dang
(74) *Attorney, Agent, or Firm*—McDonnell Boehnen Hulbert & Berghoff LLP

(57) ABSTRACT

A method and system is described for creating a mask that isolates a region of interest in a digital image. The mask is created using a second underlay image that is initialized to 255 pixel values (white). A user identifies a region of interest in the digital image by drawing a closed curve around the region of interest. The same closed curve is created automatically on the underlay image with black pixel values for the curve. The pixels in the underlay image in the area between the closed curve and the border of the underlay image are assigned pixel values equal to minimum pixel value (black). The pixels in the interior of the underlay image have 255 pixel values (white), due to the initialization of the underlay image. The mask is applied to the original image by a summing operation. Image details peripheral to the region of interest are removed, while the region of interest pixels remain undisturbed.

16 Claims, 2 Drawing Sheets

OTHER PUBLICATIONS

B.A. Huntsberger and T.L. Huntsberger, "*Hypercube Algorithms for Multi-Spectral Texture Analysis*", Proceedings of the Fourth Conference on Hypercubes, Concurrent Computers and Applications, vol. 2 pp. 1009-1012, 2 vol. xiy+1362, 1989.

P. Kalra and N. Magnenat-Thalmann, "*Modeling of Vascular Expressions in Facial Animation*", Proceedings of Computer Animation '94, pp. 50-58, 201, 1994.

J.Y Hardeberga, "*Digital Red Eye Removal*", Journal of Imaging Science and Technology, vol. 46, No. 4, Jul.-Aug. 2002.

\* cited by examiner

METHOD AND SYSTEM FOR CREATING AN IMAGE MASK

BACKGROUND

1. Field of the Invention

This invention relates generally to the field of image analysis methods and more particularly to methods of creating a mask surrounding an area of interest in an image, such that when the mask is applied to the image (e.g., though a summation operation) only the area of interest remains. The invention is applicable to digital images generally. One area where it is of particular utility is analysis of images of biological specimens. For example, the mask can serve to isolate and highlight areas of interest, such as cancerous cells, in a magnified image of a cellular or tissue specimen.

2. Description of Related Art

In the biology fields, including cytology, histology, and pathology, digital images of tissue and cellular specimens are typically obtained from a microscope equipped with a color camera which records red, green, and blue planes for these images. Frequently, the objects in the specimen can fall into two general types: normal cells and abnormal cells. The abnormal cells may for example be cells which have indicia of cancer, due to their size, shape and/or color.

It is also common practice to apply one or more stains to the specimen on the slide so that the objects of interest have a contrasting color from background objects or objects of less interest so that they are more readily identified and observed. For example, normal cells are often stained (or, counterstained as is usually said) with a stain such Hematoxylin and appear light blue, while abnormal cells (i.e. positive cells) are stained with a different stain, such as 3-amino 9-ethylcarbazol (AEC) so that the abnormal cells have a different color, e.g. reddish brown. Other color combinations are possible and known in the art.

A quantitative analysis of a limited region of interest in an image is performed in some image processing procedures. For example, image analysis techniques may be applied to a limited region of interest in order to quantify the amount of DNA or a protein present in a region of interest. The algorithms used in such techniques are easier to execute if the unwanted areas in the image, i.e., those area extraneous to the area of interest, are eliminated. Hence, masking techniques are used to isolate the region of interest. In known masking techniques, the region of interest in the image is undisturbed, but image information in the peripheral areas outside the perimeter of the region of interest is deleted, e.g., converted to black. To achieve this, a mask is created that is basically black outside of the region of interest and white (pixel values of 255) in the region of interest. The mask is applied to the image using a logical product operation, e.g., AND, wherein 255 operated by AND with any pixel value yields the pixel value and 0 operated by AND with any pixel value yields 0.

The prior art has had difficulty in easily, reliably and automatically creating a mask for a region of interest that is bounded by closed curve. The hard part is telling what "inside" is, i.e., defining the portion of the image comprising the region of interest that is interior of the closed curve. This is particularly so if the closed curve is essentially any arbitrary closed curve. Given that the region of interest in biological specimens can take virtually any conceivable shape, the algorithms have to be able to create a mask for a region of interest that is bounded by any valid closed curve. An arbitrary closed curve is reducible to a complex polygon in a digital image in which the pixels are arranged in rows and columns. Solution of the problem of whether a particular appoint in the image is inside or within any arbitrary closed curve (complex polygon) is a non-trivial problem. There are heuristics approaches that work some but not all the time, but that is not satisfactory if the image analysis procedures are to work reliably and automatically. Other solutions to the problem are more reliable than heuristics methods, but they are exceedingly complex to implement.

The present invention provides a method of creating a mask for a portion of interest in an image that is very easy to understand conceptually and code in software, very rapid to execute in a computer, and works reliably all the time. As such, it presents a useful contribution to the art. The present invention takes advantage of the insight and discovery of a way to define the area outside of the area of interest and create a mask based on the territory peripheral to the closed curve, rather than attempting to find the interior of the region of interest specified by the closed curve.

SUMMARY

In a first aspect, a method is provided for creating a mask isolating a region of interest in an image. The mask serves to delete information in the image that is peripheral to the region of interest. The method includes the step of obtaining a digital image containing the region of interest. For example, this first image may be a magnified color image of a cellular specimen, however the invention is applicable generally. The region of interest is represented by pixels having pixel values. This image is typically displayed on a computer display and a first closed curve is defined in the image, forming a perimeter around the region of interest. The step of defining the closed curve or perimeter will typically be performed by a user on the display of a workstation (e.g., using a mouse to outline the closed curve). If there are any gaps in the curve, the gaps are closed through appropriate algorithms so as to form a single closed curve.

The method includes a step of creating a second image comprising a plurality of pixels. This second image, occasionally referred to herein as an underlay image, is used to create the mask. The second image has a boundary (e.g., a rectangular boundary) corresponding to at least a portion of the first or original image. The first closed curve around the region of interest in the first image is represented in the second image as a matching second closed curve. The second closed curve in the underlay image is contained within the boundary of the underlay image. In one possible embodiment, a software tool is used such that when the user draws the perimeter of the region of interest in the first or original image, the matching closed curve is created simultaneously in the underlay image.

As noted above, the present invention makes use of the insight that it is easier to recognize the areas outside of the closed curve than it is to identify the areas inside of the closed curve. The invention carries this out by assigning all pixels on the boundary of the underlay image with a first pixel value, e.g., the minimum pixel value, e.g., 0 in an 8 bit quantization scheme (black) and similarly assigning the first (minimum) pixel values to all the other pixels peripheral to the second closed curve, e.g., by flood filling techniques. Additionally, all pixels in the underlay image within the region bounded by the second closed curve are assigned a second pixel value, e.g., 255 (white). This can be achieved by initializing the underlay image such that all pixels in the underlay image have pixel values of 255, creating the closed curve in the underlay image as a black line, and flood filling the peripheral pixels with minimum values (black).

The underlay image with the pixel values assigned as recited is then saved in memory as a mask. Application of the mask to the first image (e.g., by a logical AND operation) deletes image information for areas peripheral to the region of interest and leaves pixel values for the region of interest undisturbed. The areas peripheral to the region of interest appear black, whereas the region of interest pixels appear as in the original. Alternatively, after the mask has been applied to the original image, the resulting image can be reversed such that the peripheral areas appear white and the region of interest appears as in a negative.

In a related aspect, a workstation for creating a mask for a digital image composed of pixels having pixel values is provided. The mask isolates a region of interest in the image and deletes information in the image peripheral to the region of interest. The workstation comprises a processing unit, a user interface including a display and a pointing device associated with the display, and a memory storing the image. The workstation further includes machine-readable instructions for execution by the processing unit. The machine-readable instructions comprising instructions for:

1) displaying the image on the display;
2) providing the user the ability to define with the pointing device and the display a first closed curve forming a perimeter around the region of interest;
3) creating a second (underlay) image comprising a plurality of pixels, the second image having a boundary corresponding to at least a portion of the image encompassing and enclosing the region of interest,
4) creating in the second image a second closed curve within the boundary matching the first closed curve;
5) assigning all pixels in the second image on the boundary and peripheral to the second closed curve with a first pixel value (e.g., 0) and assigning all pixels in the second image within the region bounded by the second closed curve a second pixel value, e.g., 255 (white) and
6) applying the mask to the image and thereby deleting information peripheral to the region of interest and leaving pixel values for the region of interest undisturbed.

DETAILED DESCRIPTION OF PREFERRED EMBODIMENTS

Figure 1:
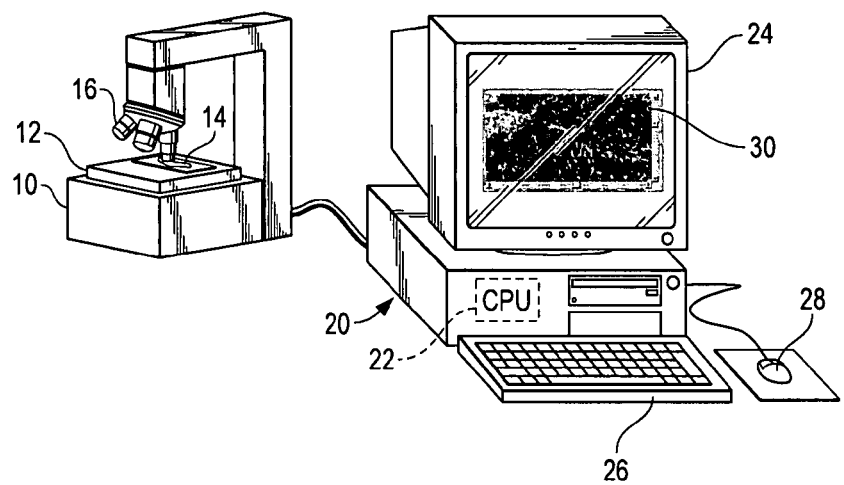
FIG. 1 is diagram on biological image environment in which the invention can be employed.

While the present image mask invention is applicable generally to digital images containing a region of interest, a presently preferred embodiment is in the field of imaging of biological samples and the invention will therefore be described in this context. FIG. 1 is an illustration of digital image acquisition apparatus that includes a microscope 10, X-Y stage 12 for holding a slide 14 containing a biological specimen, and a plurality of objective lenses for focusing a magnified image of the specimen on the slide 14 onto a charge-coupled device color imaging camera (not shown). The apparatus of FIG. 1 is conventional and known in the art. An image acquired by the camera in the microscope 10 is captured and stored in digital form and therefore can be sent over a communications link to any general-purpose computer 20. The computer 20 includes a central processing unit (CPU 22), a hard disk memory (not shown) for storing the image captured by the microscope, and a user interface including as screen display 24, computer keyboard 26 and mouse 28. The computer 20 is conventional and may be any off-the-shelf general-purpose computer. The memory of the computer 20 includes standard image processing and display software, which may consists of a package or suite of such software, for displaying images on the display 24 of the computer 20. Such software packages are known in the art and commercially available or may be standard equipment with the computer 20. In FIG. 1, the display 24 includes a display of the magnified image 30 of the specimen on the slide.

Figure 2:
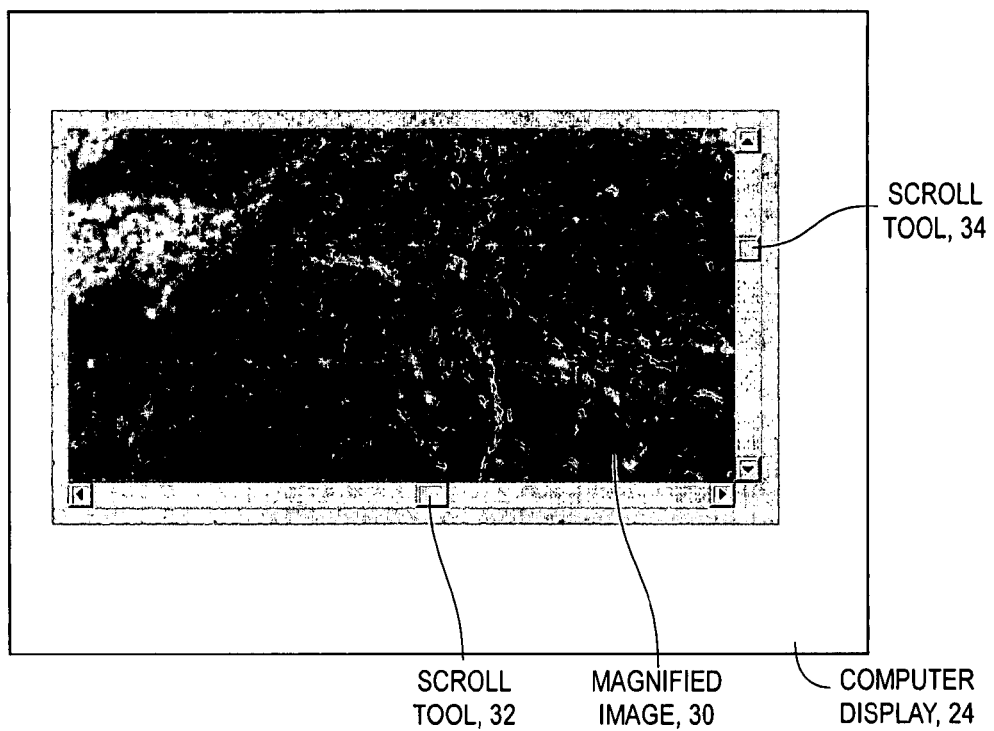
FIG. 2 is a magnified image of a tissue sample that may contain one or more regions of interest shown displayed on the user interface of the general-purpose computer of FIG. 1.

FIG. 2 is another view of the screen display 24, showing the magnified image 30 of a tissue sample on the slide 24. The image 30 may contain one or more regions of interest to a user (e.g., pathologist or cytotechnician) operating the computer. The entire slide does not fit into the window shown in FIG. 24, therefore the image display software includes tools 32 and 34 allowing the user to scroll up or down or from side to side so as to be able to view the entire region of the slide.

Figure 3:
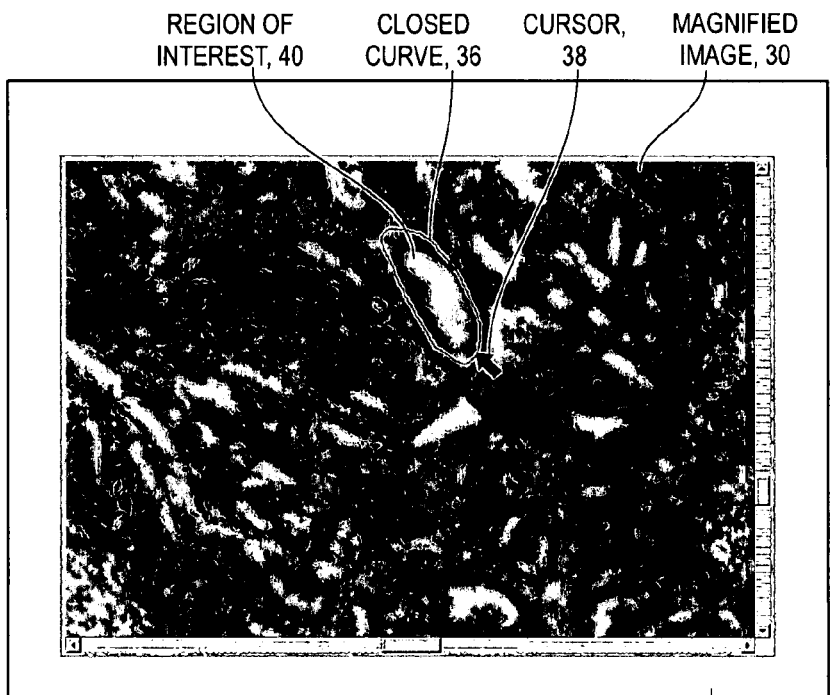
FIG. 3 is a further magnified portion of the image of FIG. 2, shown displayed on the user interface of the general-purpose computer, showing the user tracing a closed curve forming the perimeter of a region of interest with a mouse.

FIG. 3 is a further magnified portion of the image 30 of FIG. 2. The user may access this more magnified view of the slide by activating a suitable icon or entering commands via the keyboard. The user has now identified a region of interest 40 in the slide. The present invention provides a method for providing a mask around the region of interest 40 such that areas peripheral to the region 40 are black (contain no image information) but the region of interest 40 remains undisturbed. Rather than masking the entire slide except for the region of interest, a preferred embodiment masks only a rectangular area surrounding the region of interest 40.

The user marks the perimeter of the region of interest 40 by using the mouse pointing device 38, for example clicking the mouse while moving the cursor 38 around the periphery of the region of interest. This action identifies particular pixel addresses that create a closed curve 36 defining the region of interest 40. In the event that the user accidentally created gaps in the curve 36, the gaps are closed by constructing lines connecting the end points of defining the gap. This could be done by a suitable algorithm in the software or by prompting the user to click again on the image and close any gaps.

Figure 4:
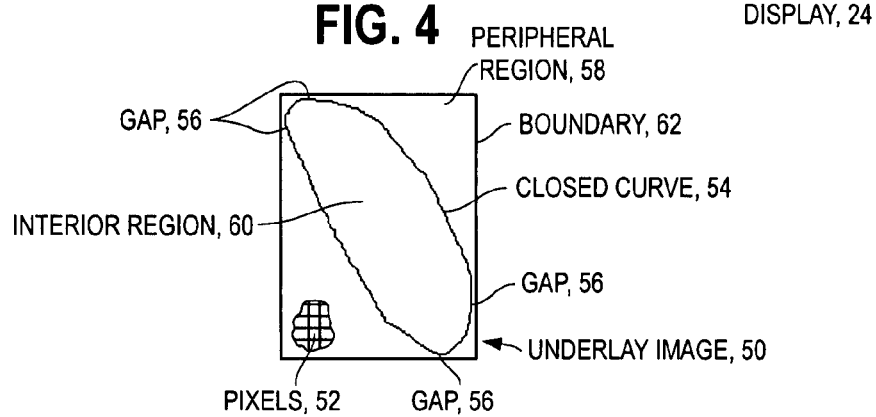
FIG. 4 is an illustration of a second or underlay image initialized to all pixel values equal to a maximum value, showing the outline of a closed curve in black that matches the closed curve drawn by the user in FIG. 3.

The present invention creates the mask by using a second or underlay image 50, shown in FIG. 4. The underlay image in the illustrated embodiment is a rectangular image, comprised of individual pixels 52 (shown greatly enlarged in FIG. 4), that corresponds to at least a portion of the original image 30. In one possible embodiment, the underlay image 50 could have the same number of pixels and be the same size as the original image. In other embodiments, for example where multiple areas of interest may be present in the original image, the underlay image 50 only corresponds to a portion of the original image that immediately surrounds the region of interest designated by the user as in FIG. 3. In the embodiment of FIG. 4, as the user draws the closed curve in FIG. 3, the same closed curve 54 is created in the underlay image 50. The underlay image size may be dynamically adjusted. The boundary 62 of the underlay image 50 may be dynamically varied substantially simultaneous with the defining of the closed curve 36, to thereby insure that the underlay image completely encompasses the closed curve 36 (curve 54 in the underlay image). This is the embodiment shown in FIG. 4. This closed curve 54 is separated from the boundary 62 of the underlay image, as indicated by the gaps 56 between the closed curve 54 and the boundary 62. The gaps can be created by adding an arbitrary number of rows and columns to the row and column pixel coordinates defining the upper, lower, left hand and right hand bounds of the closed curve. The closed curve 54 separates the interior 60 of the closed curve from the periphery 58 of the closed curve.

The underlay image of FIG. 4 is not necessarily displayed to the user and can simply exist as a file in the memory of the computer. When the underlay image is initially created, the pixel values for all pixels in the underlay image are initialized to a maximum value (white). When the closed curve 36 is drawn as shown in FIG. 3, the pixels coordinates assigned by the user with their mouse are carried over to the pixel coordinates in the underlay image and each of these pixels are assigned a minimum pixel value (0) corresponding to black.

Figure 5:
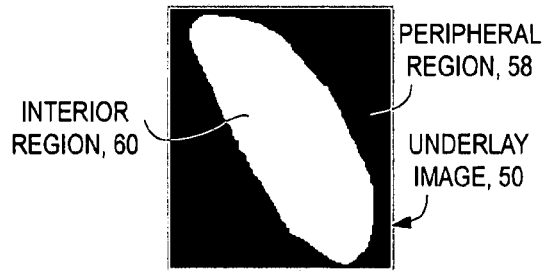
FIG. 5 is an illustration of the underlay image of FIG. 4 which forms a mask after a flood-fill operation has been performed to assign pixel values for the perimeter pixels and all pixels outside of the closed curve a minimum value (e.g., 0 in an 8 bit gray scale system). The area within the closed curve is white (pixels values equal to 255 in an 8 bit system).

With the underlay image created as shown in FIG. 4, the mask is created by flood filling the pixel values for all the pixels in the peripheral region 58 to black (0). The algorithm automatically knows the pixel coordinates for the boundary of the underlay image, and by definition the boundary is exterior of the closed curve 54 since the boundary was created by adding some positive integer number of pixels to the row and column pixel coordinates of the upper, lower, left hand and right hand extremes of the closed curve. Consequently a simple flood fill algorithm changes all pixel values for the boundary pixels and all pixels exterior of the pixels defining the closed curve 54. The result is the underlay image forming a mask shown in FIG. 5, showing interior region 60, and black pixels in the peripheral region 58.

Figure 6:
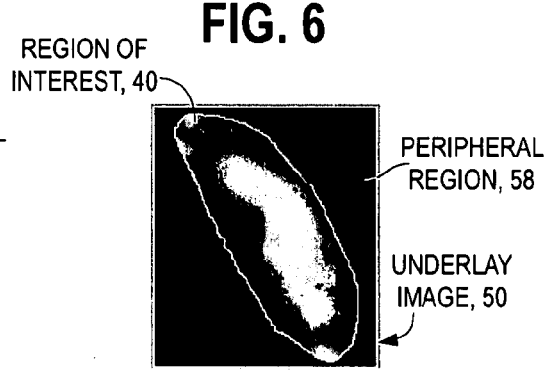
FIG. 6 shows the result of application of the mask of FIG. 5 to the image of FIG. 3 in the region surrounding the area of interest. The area peripheral to the region of interest are black (contain no image information), whereas the pixels in the region of interest are undisturbed.

The mask is applied to the original image (or a portion thereof) in a logical product operation, wherein 255 ANDed with any pixel value x returns x, and 0 ANDed with any pixel value x returns 0. The result is shown in FIG. 6. All pixels exterior of the closed curve are black (maximum pixel value) and contain no image information. The interior points containing the region of interest 46 are undisturbed.

Thus, from the above description I have described a method for creating a mask (FIG. 5) isolating a region of interest in an image, as shown in FIG. 6. The mask serves to delete information in the image that is peripheral to the region of interest, as shown in FIG. 6. The method includes the step of obtaining a digital image containing the region of interest. For example, this first image may be a magnified color image of a cellular specimen, acquired using the apparatus of FIG. 1, however the invention is applicable generally. The region of interest 40 (FIG. 3) is represented by pixels in the original image. This image is typically displayed on a computer display. A first closed curve 36 is defined in the image, forming a perimeter around the region of interest. The step of defining the closed curve or perimeter will typically be performed by a user on the display of a workstation (e.g., using a mouse to outline the closed curve), as explained above. If there are any gaps in the curve, the gaps are closed through appropriate algorithms so as to form a single closed curve.

The method includes a step of creating a second image (FIG. 4) comprising a plurality of pixels. This second or underlay image, is used to create the mask. The second image has a boundary 62 (e.g., a rectangular boundary) corresponding to at least a portion of the first or original image. The first closed curve 40 around the region of interest in the first image is represented in the second image as a matching second closed curve 54. The second closed curve in the second or underlay image is contained within the boundary of the second image. In one possible embodiment, a software tool is used such that when the user draws the perimeter of the region of interest in the first or original image, the matching closed curve 54 is created simultaneously in the second or underlay image of FIG. 4.

As noted above, the present invention makes use of the insight that it is easier to recognize the areas outside of the closed curve than it is to identify the areas inside of the closed curve. The invention carries this out by assigning all pixels on the boundary of the second image with a first pixel value, e.g., minimum pixel value, e.g., 0 in an 8 bit quantization scheme (black) and similarly assigning the same pixel value to all the other pixels peripheral to the second closed curve, e.g., by flood filling techniques. Any point in the first row ($y=0$), the first column ($x=0$), the last row ($y=$imageheight $-1$), or the last column ($x=$image width $-1$) can be chosen as a starting point for the flood fill algorithm. Once chosen, a floodfill is performed of all pixels of that color (in this case black) to convert them to black (the color of the perimeter line 54).

Additionally, all pixels in the second image within the region 60 bounded by the second closed curve are assigned a second pixel value, e.g., 255 (white). This can be achieved by initializing the second image such that all pixels in the second image have pixel values of 255, creating the closed curve in the underlay image as a black line, and flood filling the peripheral pixels with minimum values (black).

The second image with the pixel values assigned as recited is shown in FIG. 5 and then can saved in memory or a buffer as a mask.

Application of the mask of FIG. 5 to the first image (e.g., by a logical AND operation) deletes image information for areas peripheral to the region of interest and leaves pixel values for the region of interest undisturbed. See FIG. 6. The areas 58 peripheral to the region of interest appear black, whereas the region of interest 40 pixels appear as in the original. Alternatively, after the mask has been applied to the original image, the resulting image can be reversed such that the peripheral areas appear white and the region of interest appears as in a negative.

It will also be appreciated that I have described a workstation or computer 20 for creating a mask for a digital image. The workstation comprises a processing unit 22, a user interface including a display 24 and a pointing device 28/38 associated with the display 24, and a memory storing the image. The workstation further includes machine readable instructions for execution by the processing unit. The machine-readable instructions comprising instructions for:

1) displaying the image on the display, as shown in FIGS. 2 and 3;
2) providing the user the ability to define with the pointing device and the display a first closed curve 36 forming a perimeter around the region of interest, as shown in FIG. 3;
3) creating a second (underlay) image (FIG. 4) comprising a plurality of pixels 52, the second image having a boundary 62 corresponding to at least a portion of the image,
4) creating in the second image a second closed curve 54 within the boundary matching the first closed curve (as shown in FIG. 4);
5) assigning all pixels in the second image on the boundary and peripheral to the second closed curve with a first pixel value corresponding and assigning all pixels in the second image within the region bounded by said second closed curve a second pixel value, as shown in FIG. 5, and
6) applying the mask to the image as shown in FIG. 6, e.g., through a logical AND operation, thereby deleting information peripheral to the region of interest and leaving pixel values for the region of interest undisturbed.

While presently preferred embodiments have been described with particularity, variation from the details of the preferred embodiment are contemplated without departure from the true scope and spirit of the invention. For example, the nature of the original image, and the means by which the image is acquired and stored is unimportant. The method works with any arbitrary user-defined closed curve or polygon. Additionally, other pixel values could be chosen, or the black and white pixel values for the masks could be reversed and a different logical or summation operation used to apply the mask to the original image to thereby delete the information exterior to the region of interest.

What is claimed is:

1. A method for creating a mask isolating a region of interest in an image and deleting information in said image peripheral to said region of interest, comprising the steps of:
    a) obtaining a digital first image containing said region of interest, said region of interest represented by pixels having pixel values;
    b) defining a first closed curve forming a perimeter around said region of interest in said first image;
    c) creating a second image comprising a plurality of pixels, said second image having a boundary corresponding to at least a portion of said first image, wherein the first closed curve around said region of interest in said first image is represented in said second image as a matching second closed curve within said boundary in said second image;
    d) assigning all pixels in said second image on said boundary and peripheral to said second closed curve with a first pixel value and assigning all pixels in said second image within the region bounded by said second closed curve a second pixel value, and
    e) saving said second image with the pixel values assigned as in step (d) as a mask, and
    f) applying the mask to the digital first image in a logical operation wherein application of said mask to said first image via the logical operation deletes areas peripheral to said region of interest and leaves pixel values for said region of interest undisturbed.

2. The method of claim 1, wherein step b) is performed by the steps of displaying said first image on display of a general-purpose computer and defining said first closed curve by user interaction with said general-purpose computer using user interface devices provided by said general purpose computer.

3. The method of claim 2, wherein the second closed curve in said second image is created substantially simultaneously as said user interaction defines said first closed curve.

4. The method of claim 2, wherein said second image comprises a rectangular image and wherein the boundary of said rectangular image is dynamically varied substantially simultaneous with the defining of the first closed curve in said first image to thereby insure that said second image completely encompasses said first closed curve.

5. The method of claim 1, wherein said first image comprises an image of a biological specimen.

6. The method of claim 5, wherein said image comprises a magnified image.

7. The method of claim 1, wherein the logical operation comprises an AND operation.

8. A method for creating a mask isolating a region of interest in an image and deleting information in said image peripheral to said region of interest, comprising the steps of:
    a) obtaining a digital image containing said region of interest, said region of interest represented by pixels having pixel values;
    b) defining a first closed curve forming a perimeter around said region of interest in said first image;
    c) creating a second image comprising a plurality of pixels, said second image having a boundary corresponding to at least a portion of said first image, said second image initialized such that all the pixels of said second image have a first pixel value, wherein the first closed curve around said region of interest in said first image is represented in said second image as a matching second closed curve within said boundary in said second image;
    d) assigning all pixels in said second image on said boundary and peripheral to said second closed curve with a a second pixel value, and
    e) saving said second image with the pixel values assigned as in step (d) as a mask, and
    f) applying the mask to the first image in a logical operation wherein application of said mask to said first image via the logical operation deletes areas peripheral to said region of interest and leaves pixel values for said region of interest undisturbed.

9. The method of claim 8, wherein step b) is performed by the steps of displaying said first image on display of a general purpose computer and defining said first closed curve by user interaction with said general purpose computer using user interface devices provided by said general purpose computer.

10. The method of claim 9, wherein the second closed curve in said second image is created substantially simultaneously as said user interaction defines said first closed curve.

11. The method of claim 9, wherein said second image comprises a rectangular image and wherein the boundary of said rectangular image is dynamically varied substantially simultaneous with the defining of the first closed curve in said first image to thereby insure that said second image completely encompasses said first closed curve.

12. The method of claim 8, wherein said first image comprises an image of a biological specimen.

13. The method of claim 12, wherein said image comprises a magnified image.

14. The method of claim 8, wherein the logical operation comprises an AND operation.

15. A workstation for creating a mask for a digital image composed of pixels having pixel values, said mask isolating a region of interest in said image and deleting information in said image peripheral to said region of interest, comprising:
- a processing unit;
- a user interface including a display and a pointing device associated with said display;
- a memory storing said image;
- machine readable instructions for execution by said processing unit, said machine-readable instructions comprising instructions for:
  1) displaying said image on said display;
  2) providing the user the ability to define with said pointing device and said display a first closed curve forming a perimeter around said region of interest;
  3) creating a second image comprising a plurality of pixels, said second image having a boundary corresponding to at least a portion of said image encompassing and enclosing said region of interest;
  4) creating in said second image a second closed curve within said boundary matching said first closed curve;
  5) assigning all pixels in said second image on said boundary and peripheral to said second closed curve with a first pixel value and assigning all pixels in said second image within the region bounded by said second closed curve a second pixel value, and
  6) applying the mask to the image in a logical operation and thereby deleting information peripheral to said region of interest and leaves pixel values for said region of interest undisturbed.

16. The workstation of claim 15, wherein the logical operation comprises an AND operation.

* * * * *